United States Patent [19]

Bertrem et al.

[11] 3,910,555

[45] Oct. 7, 1975

[54] BUTTERFLY VALVES DISC WITH DOVETAIL GROOVE

[75] Inventors: Brad E. Bertrem; Dennis L. Young, both of Tulsa, Okla.

[73] Assignee: Dover Corporation, Tulsa, Okla.

[22] Filed: Dec. 26, 1973

[21] Appl. No.: 427,722

[52] U.S. Cl. ................................................ 251/306
[51] Int. Cl.² ............................................... F16K 1/22
[58] Field of Search .......................... 251/304–308, 251/314, 160, 173

[56] References Cited
UNITED STATES PATENTS

| | | | |
|---|---|---|---|
| 2,847,181 | 8/1958 | Muller | 251/306 |
| 2,873,942 | 2/1959 | Drane | 251/305 X |
| 2,886,062 | 5/1959 | Wheatley | 251/306 X |
| 2,965,354 | 12/1960 | Grove et al. | 251/306 X |
| 3,081,791 | 3/1963 | Wheatley | 251/306 X |
| 3,526,385 | 9/1970 | Rohrer | 251/306 |
| 3,540,696 | 11/1970 | Fawkes | 251/306 |
| 3,578,288 | 5/1971 | Rishoud | 251/306 |
| 3,752,181 | 8/1973 | Morris | 251/307 X |

FOREIGN PATENTS OR APPLICATIONS
638,395  4/1962  Italy ................................. 251/306

*Primary Examiner*—Charles J. Myhre
*Assistant Examiner*—Ira S. Lazarus

[57] ABSTRACT

This abstract describes a butterfly valve rotatable in a housing and having a plastic or resilient circumferential member to seal the disc against a circumferential seat. The improvement comprises a dovetail groove in the circumferential edge of the disc to contain a compliant member in the form of a torous having a circular cross section, the cross sectional area of the groove containing approximately 90% or more of the volume of the torous. The dovetail groove in the outer periphery of the disc comprises an entrance section having sidewalls parallel to the plane of the disc, a diverging section with sidewalls at an angle of approximately 30° to the plane of the disc. A converging section with the sidewalls approximately 45° to the plane of the disc and the bottom of the groove is of a circular cross section tangent to the walls of the converging sections.

4 Claims, 4 Drawing Figures

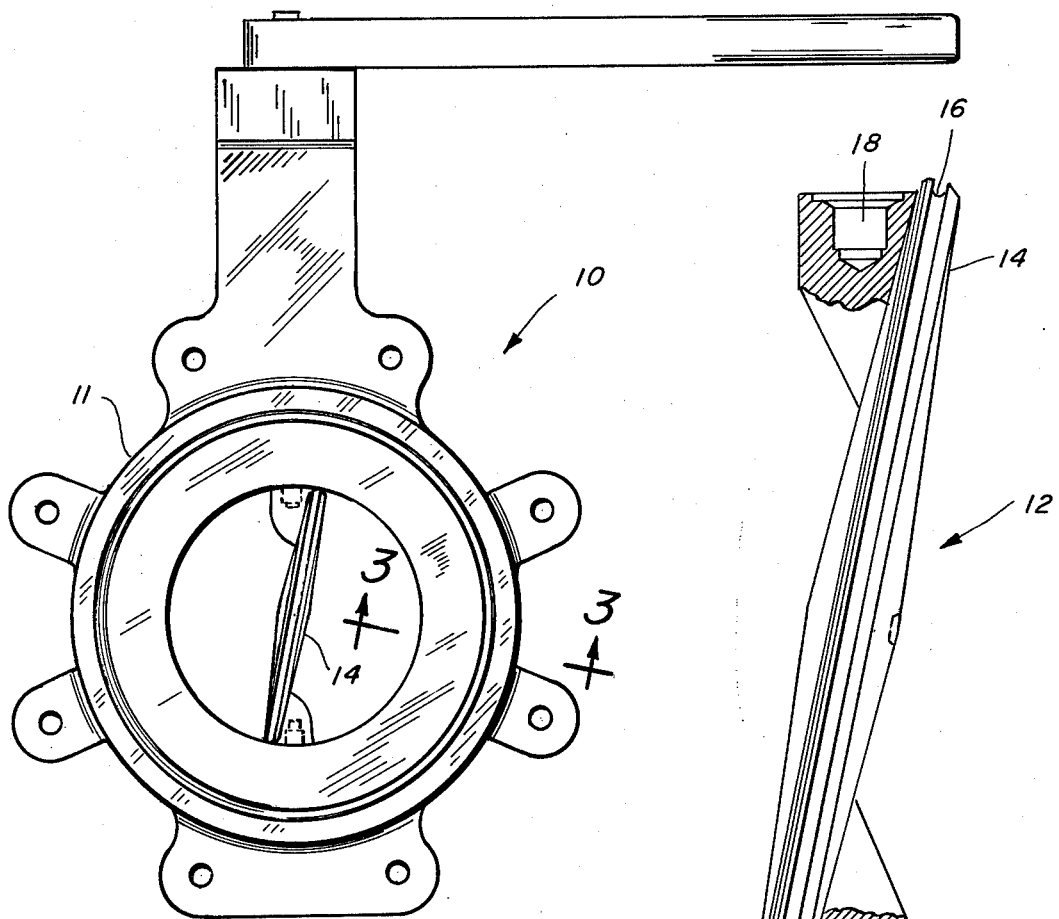
FIG. 1
FIG. 2
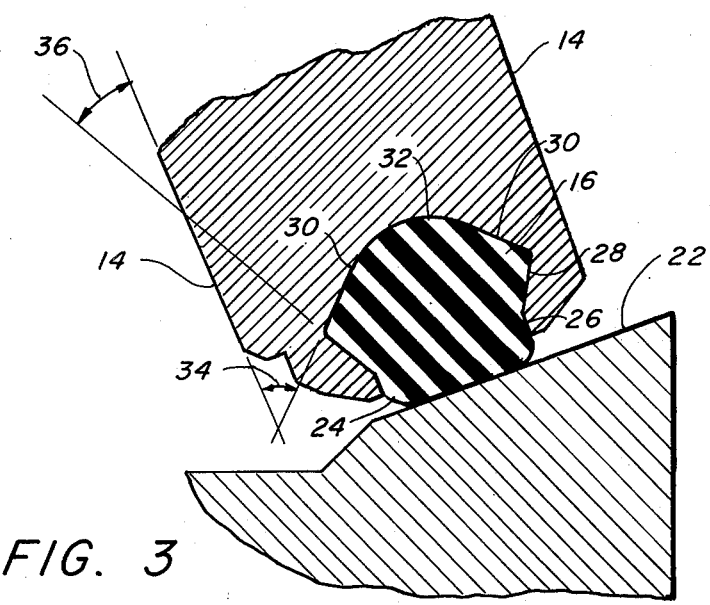
FIG. 3
FIG. 4

BUTTERFLY VALVES DISC WITH DOVETAIL GROOVE

BACKGROUND OF THE INVENTION

This invention lies in the field of valves, more particularly, it is concerned with butterfly valves in which a circular disc is mounted for 90° rotation within a housing and adapted to be sealed by plastic or resilient means against a circumferential seat in the housing. In the prior art various means have been devised for sealing such discs against a seat including the use of various types of resilient material and expandable pressure actuated seals and the like. Normally, a circumferential seal of the O rings is sealed in a circular groove along the rim of the disc. However, various difficulties occur, the most serious of which is that it is difficult to retain the sealing member in the groove. The present invention overcomes this difficulty.

SUMMARY OF THE INVENTION

It is a primary object of this invention to provide a circumferential dovetail groove in the rim of a disc of a butterfly valve in which a torous of plastic or resilient material can be inserted so that up to 90% or more of the material of the torous is inserted inside the groove and only about 10% of the material is outside the groove, to form a seal against the valve seat.

This and other objects are realized and the limitations of the prior art are overcome by using a design of dovetail groove of particular shape and cross-sectional area. The cross section is such that there is a short entrance portion having sidewalls which are parallel to the plane of the disc, a diverging section where the sidewalls are diverging at an angle of approximately 30° to the plane of the disc, a converging section where the sidewalls are converging at an angle of approximately 45° to the plane of the disc and finally there is a base portion of the groove which is circular in cross section and tangent to the converging walls.

The cross-sectional area of the groove is such that approximately 90% or more of the cross-sectional area of the O-ring lies inside the groove and approximately 10% extends out of the groove to be seated again at the valve seat. By making this groove of the shape indicated, a torous of circular cross section, when forced into the groove, will snugly fit the entire contour of the groove and because of the large volume of material inside the groove will successfully resist removal of the ring under the force of the fluid pressure held back by the valve, or by the fluid dynamics of the flow stream.

BRIEF DESCRIPTION OF THE DRAWINGS

These and other objects of this invention and a better understanding of the principles and details of the invention will be evident from the following description taken in conjunction with the appended drawings in which:

FIG. 1 represents a general view of the butterfly valve in which this invention is utilized.

FIG. 2 is a view in partial cross section of the sealing disc.

FIGS. 3 and 4 indicate, in cross section, the dovetail notch and the torous in a normal sealing condition, and when a fluid pressure is applied to the valve.

DESCRIPTION OF THE PREFERRED EMBODIMENTS

Referring now to the drawings, FIG. 1 represents a view of a butterfly valve indicated generally by the numeral 10 which comprises a housing 11 and a rotatable disc 14 mounted for 90° rotation inside the housing. FIG. 2 shows a view of the disc arranged for rotation at journals 18 and 20. The valve disc 12 has a circumferential groove 16 completely around the circumference of the disc, into which is fitted a torous of plastic or resilient material. The torous fills the notch 16 and extends outwardly enough to seal tightly against the seat in the housing 11. FIG. 3 represents in cross section a portion of the circumferential part of the disc, including the dovetail groove 16 and a torous of resilient material 24. The torous is essentially an O-ring of circular cross section.

The circumferential groove in the edge of the disc is of special configuration and cross-sectional area with respect to the cross section of the torous. In the groove there is an entrance portion 26 with sidewalls which are parallel to the plane of the disc, represented by the sidewalls 14. There is a divergent section 28 with sidewalls which diverge at an angle of approximately 30° from the plane of the disc. There is next a converging section 30 with sidewalls which are converging at an angle of approximately 45° to the plane of the disc, and the bottom of the groove 32 is of circular contour, tangent to the convergent walls 30. When the torous of circular cross section is forced into the groove it expands to nearly fill the entire internal cross sectional area of the groove with a limited amount of ring material extending out beyond the entrance section of the groove. The seal surface 22 is radially spaced from the disc by a dimension such that the outer portion of the torous is flattened against the seat surface 22 to provide an adequate pressure seal.

In FIG. 4 is indicated the action when a fluid pressure indicated by the arrow 40, representing the direction of applied fluid pressure, is applied to the sealing ring 24. The pressure causes a displacement of the material of the ring to go in the direction of the applied force or pressure, and leaving a certain amount of space 42 against which the pressure acts, so as to wedge the resilient material into the space 38 to provide a self-energizing seal. Thus with this configuration and size of notch, there is a complete seal between the disc and the seat against the pressure P. Furthermore, because of the limited clearance between the outer edge of the disc and the seat, the limitation on the amount of material in the disc which extends out behond the groove, there is no opportunity for the material of the ring to be blown out, or forced out of the groove, under the effect of the pressure P or the fluid dynamics of the flow stream.

While the invention has been described with a certain degree of particularity, it is manifest that many changes may be made in the details of construction and the arrangement of components. It is understood that the invention is not to be limited to the specific embodiment set forth hereby by way of exemplifying the invention, but the invention is to be limited only by the scope of the attached claim or claims, including the full range of equivalency to which each element or step thereof is entitled.

What is claimed is:

1. In a butterfly valve in which the periphery of a rotatable disc is sealed against a circumferential seat by circumferential compliant means, the improvement comprising:
   a. a circumferential sealing member comprising a torous of compliant material, said torous of circular cross-section;
   b. a circumferential generally dovetail shaped groove in the circumferential surface of said disc;
   c. said generally dovetail shaped groove being defined in cross-section perpendicular the plane of the disc by:
      1. a short entrance section having spaced apart planar sidewalls parallel to the plane of said disc;
      2. a divergent section having opposed diverging sidewalls, each connected to a said planar sidewall, each diverging sidewall diverging at the same selected angle to the plane of said disc;
      3. a converging section having opposed converging sidewalls, each connected to a said diverging sidewall, the converging sidewall converging at the same selected angle to the plane of said disc; and
      4. a circular section each end of which is tangent to and connecting with said converging sidewall, said sealing member being received in said generally dovetailed shaped groove and extending partially outwardly beyond said groove to sealably engage said circumferential seal when the plane of said disc is aligned with said circumferential seat.

2. The valve disc as in claim 1 in which the cross-sectional area of said groove is such that more than 90% of the cross section of said sealing member lies within said groove.

3. The valve disc as in claim 1 in which each said diverging sidewall diverges from the plane of said disc at an angle of about 15°.

4. The valve disc as in claim 1 in which each said converging sidewall converges towards the plane of said disc at an angle of about 22½°.

* * * * *